US012688009B1

(12) United States Patent
Mundra et al.

(10) Patent No.: US 12,688,009 B1
(45) Date of Patent: Jul. 21, 2026

(54) INTERMEDIATE SORTING FOR DATA SET PROJECTION BUILDS

(71) Applicant: Amazon Technologies, Inc., Seattle, WA (US)

(72) Inventors: Sagar Mundra, San Jose, CA (US); Sameer Jain, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/979,926

(22) Filed: Dec. 13, 2024

(51) Int. Cl.
| | |
|---|---|
| *G06F 16/00* | (2019.01) |
| *G06F 7/08* | (2006.01) |
| *G06F 16/21* | (2019.01) |
| *G06F 16/27* | (2019.01) |

(52) U.S. Cl.
CPC .............. *G06F 7/08* (2013.01); *G06F 16/212* (2019.01); *G06F 16/27* (2019.01)

(58) Field of Classification Search
CPC ........... G06F 7/08; G06F 16/212; G06F 16/27
See application file for complete search history.

(56) References Cited

U.S. PATENT DOCUMENTS

| | | | |
|---|---|---|---|
| 8,868,624 B2 | 10/2014 | Calder et al. | |
| 11,327,937 B1 | 5/2022 | Muniswamy Reddy et al. | |
| 11,514,014 B2 | 11/2022 | Graefe | |
| 12,216,648 B1 * | 2/2025 | Chintala | G06F 16/2453 |
| 2018/0262864 A1 * | 9/2018 | Reynolds | G06F 16/254 |
| 2021/0109629 A1 * | 4/2021 | Reynolds | G06F 3/0482 |
| 2021/0365344 A1 * | 11/2021 | Bui | G06F 11/34 |
| 2022/0058183 A1 * | 2/2022 | Duffield | G06F 16/2393 |
| 2025/0021573 A1 * | 1/2025 | Jacob | G06F 16/219 |

* cited by examiner

*Primary Examiner* — Alexander Khong
(74) *Attorney, Agent, or Firm* — S. Scott Foster; Kowert, Hood, Munyon, Rankin & Goetzel, P.C.

(57) ABSTRACT

An intermediate sorted version of a projection of a data set is used to create the projection of the data set. A copy of the data set can be accessed to store an intermediate sorted version and determine a number of portions to the projection of the data set across a number of data stores. Then, distributed execution to create the projection of the data set to be performed from different portions of the number of portions to store at respective ones of the data stores.

17 Claims, 7 Drawing Sheets

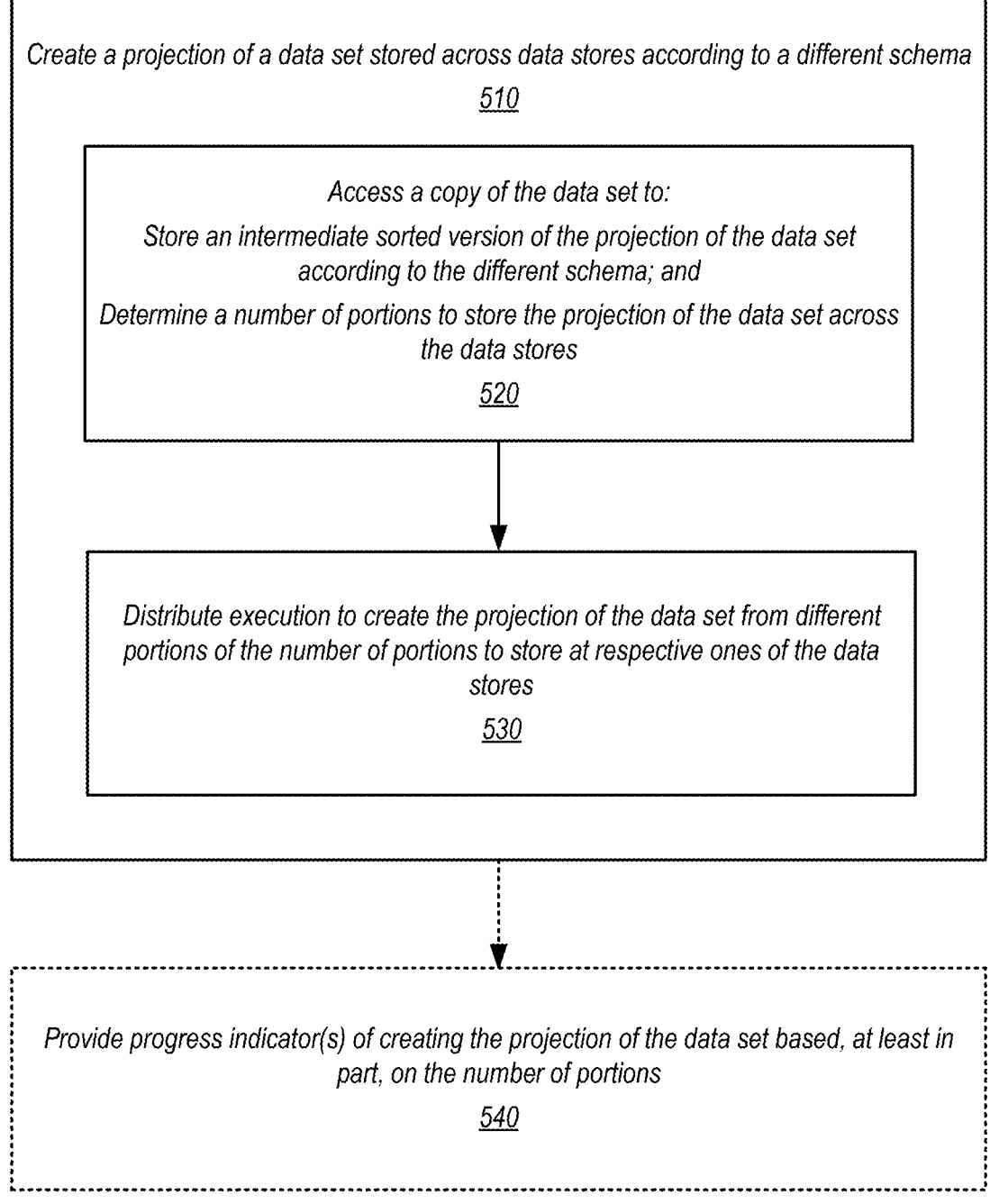

*Create a projection of a data set stored across data stores according to a different schema*
<u>510</u>

*Access a copy of the data set to:*

*Store an intermediate sorted version of the projection of the data set according to the different schema; and*

*Determine a number of portions to store the projection of the data set across the data stores*
<u>520</u>

*Distribute execution to create the projection of the data set from different portions of the number of portions to store at respective ones of the data stores*
<u>530</u>

*Provide progress indicator(s) of creating the projection of the data set based, at least in part, on the number of portions*
<u>540</u>

*FIG. 5*

INTERMEDIATE SORTING FOR DATA SET PROJECTION BUILDS

BACKGROUND

Data is often distributed to scale the storage capacity or processing capacity of systems that provide access to the data. For example, database tables or other data objects can be divided into partitions in order to leverage the capacity of different hosts, such as different servers or other computing devices, to separately provide access to individual partitions. However, replicating different portions of the partitioned data can further increase the complexity and costs of propagating changes to the data to other data replicas. For example, projections or views of a partitioned database table may be separately maintained. Propagating changes to the projection or views may increase the costs of processing updates at the original partitions of the database table as the original partitions of the database table may need to ensure that the appropriate projections or views of the database table are updated.

BRIEF DESCRIPTION OF THE DRAWINGS

FIG. 5 is a high-level flowchart illustrating various methods and techniques to implement intermediate sorting for data set projection builds, according to some embodiments.

Figure 1:
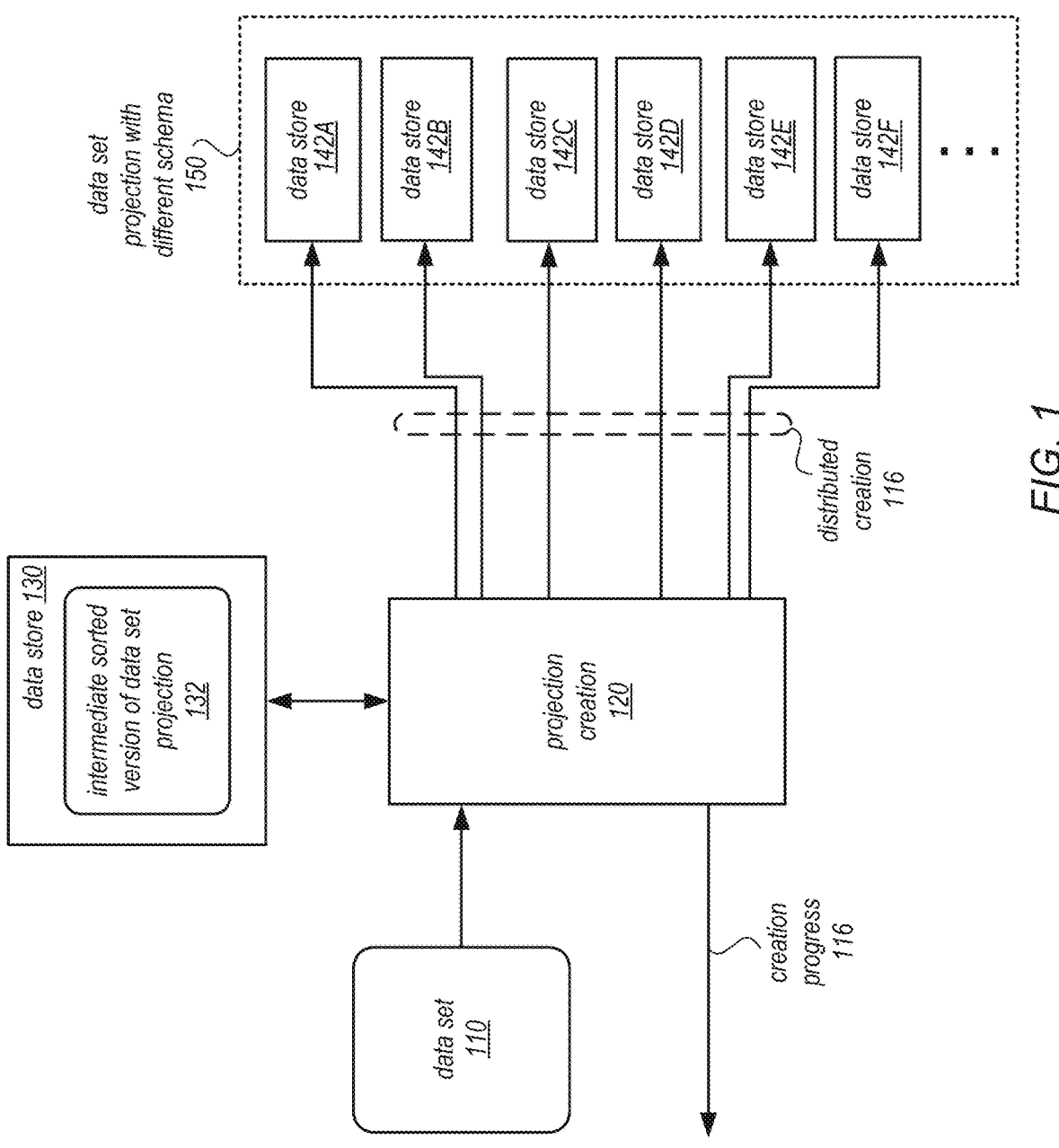
FIG. 1 is a logical block diagram illustrating intermediate sorting for data set projection builds, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The techniques described herein may implement intermediate sorting for data set projection builds, according to some embodiments. Data sets may be distributed across one or more locations in a storage system, in some embodiments. In this way, clients can access and independently update different portions of the data set at the one or more locations in the storage system, in some embodiments. The arrangement of the data set may be optimal for some access requests (e.g., queries based on indexed fields or values in the table). However, to optimally process other access requests (e.g., queries based on non-indexed fields or values in a table), portions of the data set (or the entire data set) may be replicated in one or more other locations (e.g., a different storage nodes, systems, or hosts) in a different arrangement, subset, or format that is more performant for performing the other type of access requests according to a schema that defines the different arrangement, subset, or format, in some embodiments.

For example, in some scenarios, locating items that have particular attributes may cause a scan across all (or a large number) of items in order to locate the items with the particular attributes. However, a projection of the data set defined by a different schema can be used to identify those items with the particular attributes. The different schema can be used to create the projection of the data set (e.g., as a secondary index), that provides an alternative data structure to search for items with those particular attribute values. For instance, a table that includes items for registered users may include a user identifier, which may be a unique, primary key for the item, along with a first name attribute, last name attribute, location attribute, and age attribute. A secondary index may be generated for the table which can index items according to other values than the key value pair, such as location and age. For example, the secondary index may be generated so that all items with same location and attribute values are stored together according to age attribute value order. In this way, an access request for data that specifies a particular range of ages for a location may be quickly obtained without performing a scan of the entire table of items, as noted above. Other attribute values may also be defined by the schema and thus included in the projection, such as first and last name attribute values.

Instead of relying upon the resources of a source storage location for data set to create a new projection of a data set, such as a projection like a secondary index as discussed below, techniques that index or otherwise determine which portions of a source data to replicate to the new replica using other resources, such as a separate system component or node, may be implemented. Different creation techniques, such as using a copy (e.g., a backup copy of a data set, such as a snapshot), may offer different performance advantages to creating projections of data sets stored according to a different schema).

In various embodiments, an offline technique to build a projection of a data set may be used, as noted above. For example, in some embodiments, techniques for offline index builds, a table's copy (e.g., a snapshot which may be a state of a table corresponding to a point in time) may be used to build a secondary index by calculating index projections according to a schema specified or defined for the secondary index and insert projected items into a new data store for the secondary index. This secondary index may not have the same schema as the table. In such cases, there can be workloads where heat from table is directed towards a subset of index data stores (e.g., partitions), resulting in resource contention and high index build times (e.g., in the order of weeks) for very large database tables (e.g., 1PB+ data). As each data store may have a maximum limit on the throughput it can serve per sec, automated management techniques, such as partition or other data movement techniques may scale the index by splitting partitions. Splitting or other data movement techniques may not guarantee that data will be written uniformly to all the data store. In some scenarios, skew in the data being projected into the secondary index and how index build resources write it can result in a lot more partitions than desired, wasting system resources and increasing cost of storing a secondary index. In some cases, sustained splitting other data movement techniques can result in a movement "storm", which may put a distributed data storage system under load and create noisy neighbor impact to other database partitions co-located on the same machines in a multi-tenant system. Moreover, the unknowns of projecting data using a different schema may make it difficult to efficiently allocate resources to optimally complete building a projection. Additionally, determining building progress may not provide insight into projection build time, making it difficult for subsequent systems that may ultimately rely upon the projection to when a projection is ready and available to be use.

As discussed in detail below, techniques that implement intermediate sorting for data set projection builds can collect information to optimally plan for and execute creation or building of a projection of a data set with a different schema to avoid, for example, in efficient allocation of resources. Additionally, such techniques may improve parallel or other distributed execution of building/creating a projection in a distributed data store as well as avoid split or other data movement storms, and provide reliable progress indicators to users.

FIG. 1 is a logical block diagram illustrating intermediate sorting for data set projection builds, according to some embodiments. Data set 110 may be a set one of more documents, tables, data objects, files or other data items that are updated according to various data set updates 105 (e.g., to add, remove, or modify information in data set). Data set projection 150 with a different schema may be stored across different data stores, 142a, 142b, 142c, 142d, 142e, and 142f. A different schema may select a subset of specific data values, objects, records, attributes, or other portions of data set 110 that satisfy or correspond to values, ranges, of values, or other criteria. In at least one embodiment, a different schema may include an arrangement for ordering or organization of information in data set projection 150.

In at least one embodiment, data set 110 and data set projection 150 and projection creation 120 may be implemented as part of a distributed storage system (e.g., a database service, storage service, or various other types of distributed storage). In at least one embodiment, projection creation 120 may receive a request to create data set projection 150, which may include instructions for the different schema. Projection creation 120 may access data set 110 in order to obtain data or other information from data set 110 that satisfies the different schema. In at least one embodiment, data set 110 may be divided into chunks and evaluated in parallel with respect to the different schema (e.g., as discussed below with regard to FIGS. 3 and 4).

Projection creation 120 may then use another data store 130 to store intermediate sorted version of a data set projection 132. Intermediate sorted version of data set projection 132 may rearrange and/or include only the data that satisfies the different schema. Because data set 110 may be very large, intermediate sorted version may be created using online or streaming sorting techniques, such as merge sort, storing intermediated sorted version 132 so that information, such as the number of portions (e.g., partitions) to be used to store data set projection 150, as well as to generate a plan for distributed creation, as discussed in detail below with regard to FIG. 6. Projection creation 120 may use a number of computing resources (e.g., separate worker nodes, processes, or other computing resources that can be executed in parallel) to access intermediate sorted version of data set projection 132 to store as data set projection 150 across data stores 142.

This specification continues with a general description of a provider network that may implement a database service that may implement intermediate sorting for data set projection builds. Then, various examples of database service are discussed, including different components/modules, or arrangements of components/modules, that may be employed as part of implementing the database service, in some embodiments. A number of different methods and techniques to implement intermediate sorting for data set projection builds, are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
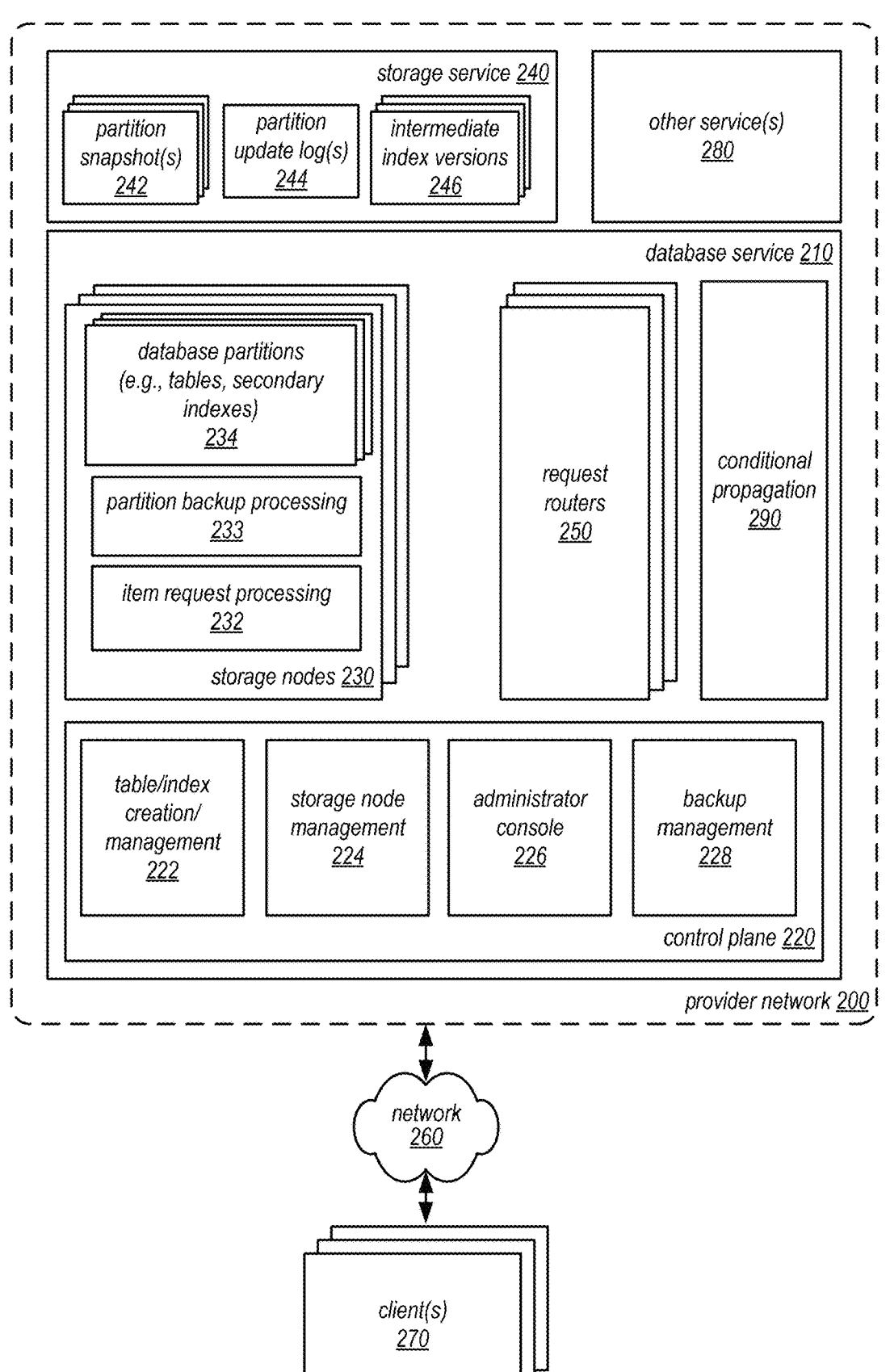
FIG. 2 is a logical block diagram illustrating a provider network offering a database service that may implement intermediate sorting for data set projection builds, according to some embodiments.

FIG. 2 is a logical block diagram illustrating a provider network offering a database service that may implement intermediate sorting for data set projection builds, according to some embodiments. Provider network 200 may be a private or closed system, in some embodiments, or may be set up by an entity such as a company or a public sector organization to provide one or more services (such as various types of cloud-based storage) accessible via the Internet and/or other networks to clients 270, in another embodiment. In some embodiments, provider network 200 may be implemented in a single location or may include numerous data centers hosting various resource pools, such as collections of physical and/or virtualized computer servers, storage devices, networking equipment and the like (e.g., computing system 1000 described below with regard to FIG. 7), needed to implement and distribute the infrastructure and storage services offered by the provider network 200. In some embodiments, provider network 200 may implement various computing resources or services, such as database service 210 (e.g., a non-relational (NoSQL) database, relational database service or other database service that may utilize collections of items (e.g., tables that include items)), and other services (not illustrated), such as data flow processing service, and/or other large scale data processing techniques), data storage services (e.g., an object storage service, block-based storage service, or data storage service that may store different types of data for centralized access), virtual compute services, and/or any other type of network-based services (which may include various other types of storage, processing, analysis, communication, event handling, visualization, and security services).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), in some embodiments, each of which may be similar to the computer system embodiment illustrated in FIG. 7 and described below. In some embodiments, the functionality of a given system or service component (e.g., a component of database service 210) may be implemented by a particular node or may be distributed across several nodes. In some embodiments, a given node may implement the functionality of more than one service system component (e.g., more than one data store component).

Database service 210 may implement various types of distributed database services, in some embodiments, for storing, accessing, and updating data in tables hosted in a database. Such services may be enterprise-class database systems that are highly scalable and extensible. In some embodiments, access requests (e.g., requests to get/obtain items, put/insert items, delete items, update or modify items, scan multiple items) may be directed to a table in database service 210 that is distributed across multiple physical resources, and the database system may be scaled up or down on an as needed basis. In some embodiments, clients/subscribers may submit requests in a number of ways, e.g., interactively via graphical user interface (e.g., a console) or a programmatic interface to the database system. In some embodiments, database service 210 may provide a RESTful programmatic interface in order to submit access requests (e.g., to get, insert, delete, or scan data). In some embodiments, a query language (e.g., Structured Query Language (SQL)) may be used to specify access requests.

In some embodiments, clients 270 may encompass any type of client configurable to submit network-based requests to provider network 200 via network 260, including requests for database service 210 (e.g., to access item(s) in a table or secondary index in database service 210). For example, in some embodiments a given client 270 may include a suitable version of a web browser, or may include a plug-in module or other type of code module that executes as an extension to or within an execution environment provided by a web browser. Alternatively in a different embodiment, a client 270 may encompass an application such as a database client/application (or user interface thereof), a media application, an office application or any other application that may make use of a database in database service 210 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 270 may be an application that interacts directly with provider network 200, in some embodiments. In some embodiments, client 270 may generate network-based services requests according to a Representational State Transfer (REST)-style network-based services architecture, a document- or message-based network-based services architecture, or another suitable network-based services architecture. Note that in some embodiments, clients of database service 210 may be implemented within provider network 200 (e.g., applications hosted on a virtual compute service).

In some embodiments, clients of database service 210 may be implemented on resources within provider network 200 (not illustrated). For example, a client application may be hosted on a virtual machine or other computing resources implemented as part of another provider network service that may send access requests to database service 210 via an internal network (not illustrated).

In some embodiments, a client 270 may provide access to provider network 200 to other applications in a manner that is transparent to those applications. For example, client 270 may integrate with a database on database service 210. In such an embodiment, applications may not need to be modified to make use of a service model that utilizes database service 210. Instead, the details of interfacing to the database service 210 may be coordinated by client 270.

Client(s) 270 may convey network-based services requests to and receive responses from provider network 200 via network 260, in some embodiments. In some embodiments, network 260 may encompass any suitable combination of networking hardware and protocols necessary to establish network-based-based communications between clients 270 and provider network 200. For example, network 260 may encompass the various telecommunications networks and service providers that collectively implement the Internet. In some embodiments, network 260 may also include private networks such as local area networks (LANs) or wide area networks (WANs) as well as public or private wireless networks. For example, both a given client 270 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client(s) 270 and the Internet as well as between the Internet and provider network 200. It is noted that in some embodiments, client(s) 270 may communicate with provider network 200 using a private network rather than the public Internet.

Database service 210 may implement request routers 250, in some embodiments. Request routers 250 may receive and parse client access requests, in various embodiments in order to determine various features of the request, to parse, authenticate, throttle and/or dispatch access requests, among other things, in some embodiments.

In some embodiments, database service 210 may implement control plane 220 to implement one or more administrative components, such as automated admin instances or nodes (which may provide a variety of visibility and/or control functions). In various embodiments, control plane 220 may direct the performance of different types of control plane operations among the nodes, systems, or devices implementing database service 210, in some embodiments. Although not illustrated, control plane 220 may provide visibility and control to system administrators via administrator console, in some embodiment. Administrator console may allow system administrators to interact directly with database service 210 (and/or the underlying system). In some embodiments, the administrator console may be the primary point of visibility and control for database service 210 (e.g., for configuration or reconfiguration by system administrators). For example, the administrator console may be implemented as a relatively thin client that provides display and control functionally to system administrators and/or other privileged users, and through which system status indicators, metadata, and/or operating parameters may be observed and/or updated. Control plane 220 may provide an interface or access to information stored about one or more detected control plane events, such as data backup management 228, which may include creating secondary indexes for tables or copies of a tables using backups, or other management operations for a table, at database service 210, in some embodiments.

Storage node management 224 may provide resource allocation, in some embodiments, for storing additional data in table submitted to database service 210. For instance, control plane 220 may communicate with storage nodes 230 to initiate the performance of various control plane operations, such as moves of table partitions, merges of table partitions, splits of table partitions, update tables (e.g., data set updates and replicated updates, etc.), delete tables, create secondary indexes, etc. . . . In some embodiments, control plane 220 may include a node recovery feature or component that handles failure events for storage nodes 230, propagation architectures 290 and request routers 250 (e.g., adding new nodes, removing failing or underperforming nodes, deactivating or decommissioning underutilized nodes, etc.).

Various durability, resiliency, control, or other operations may be directed by control plane 220. For example, storage node management 224 may detect merge, split, copy, or move events for partitions at storage nodes in order to ensure that the storage nodes maintain satisfy a minimum performance level for performing access requests. For instance, in various embodiments, there may be situations in which a partition (or a replica thereof) may need to be copied, e.g., from one storage node to another. For example, if there are three replicas of a particular partition, each hosted on a different physical or logical machine, and one of the machines fails, the replica hosted on that machine may need to be replaced by a new copy of the partition on another machine. In another example, if a particular machine that hosts multiple partitions of one or more tables experiences heavy traffic, one of the heavily accessed partitions may be moved (using a copy operation) to a machine that is experiencing less traffic in an attempt to more evenly distribute the system workload and improve performance. In some embodiments, storage node management 224 may perform partition moves using a physical copying mechanism (e.g., a physical file system mechanism, such as a file copy mechanism) that copies an entire partition from one machine to another, rather than copying a snapshot of the partition data row by. While the partition is being copied, write operations targeting the partition may be logged. During the copy operation, any logged write operations may be applied to the partition by a catch-up process at periodic intervals (e.g., at a series of checkpoints). Once the entire partition has been copied to the destination machine, any remaining logged write operations (i.e. any write operations performed since the last checkpoint) may be performed on the destination partition by a final catch-up process. Therefore, the data in the destination partition may be consistent following the completion of the partition move, in some embodiments. In this way, storage node management 224 can move partitions amongst storage nodes 230 while the partitions being moved are still "live" and able to accept access requests.

In some embodiments, the partition moving process described above may be employed in partition splitting operations by storage node management 224 in response to the detection of a partition split event. For example, a partition may be split because it is large, e.g., when it becomes too big to fit on one machine or storage device and/or in order to keep the partition size small enough to quickly rebuild the partitions hosted on a single machine (using a large number of parallel processes) in the event of a machine failure. A partition may also be split when it becomes too "hot" (i.e. when it experiences a much greater than average amount of traffic as compared to other partitions). For example, if the workload changes suddenly and/or dramatically for a given partition, the system may be configured to react quickly to the change. In some embodiments, the partition splitting process described herein may be transparent to applications and clients/users, which may allow the data storage service to be scaled automatically (i.e. without requiring client/user intervention or initiation).

In some embodiments, each database partition 234 may be identified by a partition ID, which may be a unique number (e.g., a GUID) assigned at the time the partition is created. A partition 234 may also have a version number that is incremented each time the partition goes through a reconfiguration (e.g., in response to adding or removing replicas, but not necessarily in response to a master failover). When a partition is split, two new partitions may be created, each of which may have a respective new partition ID, and the original partition ID may no longer be used, in some embodiments. In some embodiments, a partition may be split by the system using a split tool or process in response to changing conditions.

Split or move events may be detected by storage node management 224 in various ways. For example, partition size and heat, where heat may be tracked by internally measured metrics (such as IOPS), externally measured metrics (such as latency), and/or other factors may be evaluated with respect to various performance thresholds.

System anomalies may also trigger split or move events (e.g., network partitions that disrupt communications between replicas of a partition in a replica group, in some embodiments. Storage node management 224 may detect storage node failures, or provide other anomaly control, in some embodiments. If the partition replica hosted on the storage node on which a fault or failure was detected was the master for its replica group, a new master may be elected for the replica group (e.g., from amongst remaining storage nodes in the replica group). Storage node management 224 may initiate creation of a replacement partition replica while the source partition replica is live (i.e. while one or more of the replicas of the partition continue to accept and service requests directed to the partition), in some embodiments. In various embodiments, the partition replica on the faulty storage node may be used as the source partition replica, or another replica for same partition (on a working machine) may be used as the source partition replica, e.g., depending type and/or severity of the detected fault.

Control plane 220 may implement table/index creation and management 222 to manage the creation (or deletion) of database tables and/or secondary indexes hosed in database service 210, in some embodiments. For example, a request to create a secondary index may be submitted via administrator console 226 (or other database service 210 interface) which may initiate performance of a workflow to generate appropriate system metadata (e.g., a table identifier that is unique with respect to all other tables in database service 210, secondary index performance or configuration parameters, and/or various other operations for creating a secondary index as discussed below).

In some embodiments, database service 210 may also implement a plurality of storage nodes 230, each of which may manage one or more partitions of a database table or secondary index on behalf of clients/users or on behalf of database service 210 which may be stored in database storage 234 (on storage devices attached to storage nodes 230 or in network storage accessible to storage nodes 230).

In some embodiments, database service 210 may also implement conditional propagation architecture 290, which may manage replication of updates performed on a first data set, to a second data set, where the first and second data sets may include different distributions (e.g., according to different schemas).

Storage nodes 230 may implement item request processing 232, in some embodiments. Item request processing 232 may perform various operations (e.g., read/get, write/update/modify/change, insert/add, or delete/remove) to access individual items stored in tables in database service 210, in some embodiments. In some embodiments, item request processing 232 may support operations performed as part of a transaction, including techniques such as locking items in a transaction and/or ordering requests to operate on an item as part of transaction along with other requests according to timestamps (e.g., timestamp ordering) so that storage nodes 230 can accept or reject the transaction-related requests. In some embodiments, item request processing 232 may maintain database partitions 234 according to a database model (e.g., a non-relational, NoSQL, or other key-value database model). In some embodiments, item request processing 232 may perform operations to update, store, and/or send an update replication log to a propagation architecture 290, as discussed below with regard to FIG. 3.

In some embodiments, database service 210 may provide functionality for creating, accessing, and/or managing tables or secondary indexes at nodes within a multi-tenant environment. For example, different database partitions 234 may store table item(s) from respective tables, indexes, or other data stored on behalf of different clients, applications, users, accounts or non-related entities, in some embodiments.

In addition to dividing or otherwise distributing data (e.g., database tables) across storage nodes 230 in separate partitions, storage nodes 230 may also be used in multiple different arrangements for providing resiliency and/or durability of data as part of larger collections or groups of resources. A replica group, for example, may be composed of a number of storage nodes maintaining a replica of particular portion of data (e.g., a partition) for the database service 210. Moreover, different replica groups may utilize overlapping nodes, where a storage node 230 may be a member of multiple replica groups, maintaining replicas for each of those groups whose other storage node 230 members differ from the other replica groups.

Different models or formats for storing data for database tables in database service 210 may be implemented, in some embodiments. For example, in some embodiments, non-relational, NoSQL, semi-structured, or other key-value data formats may be implemented. In at least some embodiments, the data model may include tables containing items that have one or more attributes. In such embodiments, each table maintained on behalf of a client/user may include one or more items, and each item may include a collection of one or more attributes. The attributes of an item may be a collection of one or more name-value pairs, in any order, in some embodiments. In some embodiments, each attribute in an item may have a name, a type, and a value. In some embodiments, the items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s) and version attributes, in some embodiments. In some embodiments, the tables maintained by the database service 210 (and the underlying storage system) may have no pre-defined format other than their reliance on the primary key.

Metadata or other system data for tables may also be stored as part of database partitions using similar partitioning schemes and using similar indexes, in some embodiments.

Database service 210 may provide an application programming interface (API) for requesting various operations targeting tables, indexes, items, and/or attributes maintained on behalf of storage service clients. In some embodiments, the service (and/or the underlying system) may provide both control plane APIs and data plane APIs. The control plane APIs provided by database service 210 (and/or the underlying system) may be used to manipulate table-level entities, such as tables and indexes and/or to re-configure various tables These APIs may be called relatively infrequently (when compared to data plane APIs). In some embodiments, the control plane APIs provided by the service may be used to create tables or secondary indexes for tables at separate storage nodes, import tables, export tables, delete tables or secondary indexes, explore tables or secondary indexes (e.g., to generate various performance reports or skew reports), modify table configurations or operating parameter for tables or secondary indexes, and/or describe tables or secondary indexes, and create and/or associate functions with tables. In some embodiments, control plane APIs that perform updates to table-level entries may invoke asynchronous workflows to perform a requested operation. Methods that request "description" information (e.g., via a describeTables API) may simply return the current known state of the tables or secondary indexes maintained by the service on behalf of a client/user. The data plane APIs provided by database service 210 (and/or the underlying system) may be used to perform item-level operations, such as requests for individual items or for multiple items in one or more tables table, such as queries, batch operations, and/or scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

Database service 210 may include support for some or all of the following operations on data maintained in a table (or index) by the service on behalf of a storage service client: perform a transaction (inclusive of one or more operations on one or more items in one or more tables), put (or store) an item, get (or retrieve) one or more items having a specified primary key, delete an item, update the attributes in a single item, query for items using an index, and scan (e.g., list items) over the whole table, optionally filtering the items returned, or conditional variations on the operations described above that are atomically performed (e.g., conditional put, conditional get, conditional delete, conditional update, etc.). For example, the database service 210 (and/or underlying system) described herein may provide various data plane APIs for performing item-level operations, such as a TransactItems API, PutItem API, a GetItem (or GetItems) API, a DeleteItem API, and/or an UpdateItem API, as well as one or more index-based seek/traversal operations across multiple items in a table, such as a Query API and/or a Scan API.

Storage service 240 may be file, object-based, or other type of storage service that may be used to store partition snapshots 242 as backups. Storage service 240 may implement striping, sharding, or other data distribution techniques so that different portions of a partition backup 242 are stored across multiple locations (e.g., at separate nodes). In various embodiments, storage nodes 230 may implement partition backup processing 233 to store partition snapshots 242 (e.g., by storing a copy of a partition 234 as of a point-in-time as a snapshot object 242 in storage service 240. In at least some embodiments, update logs 244 (e.g., created by updates for database partitions 234 by item request processing 232) may be stored as objects in storage service 240.

Figure 3:
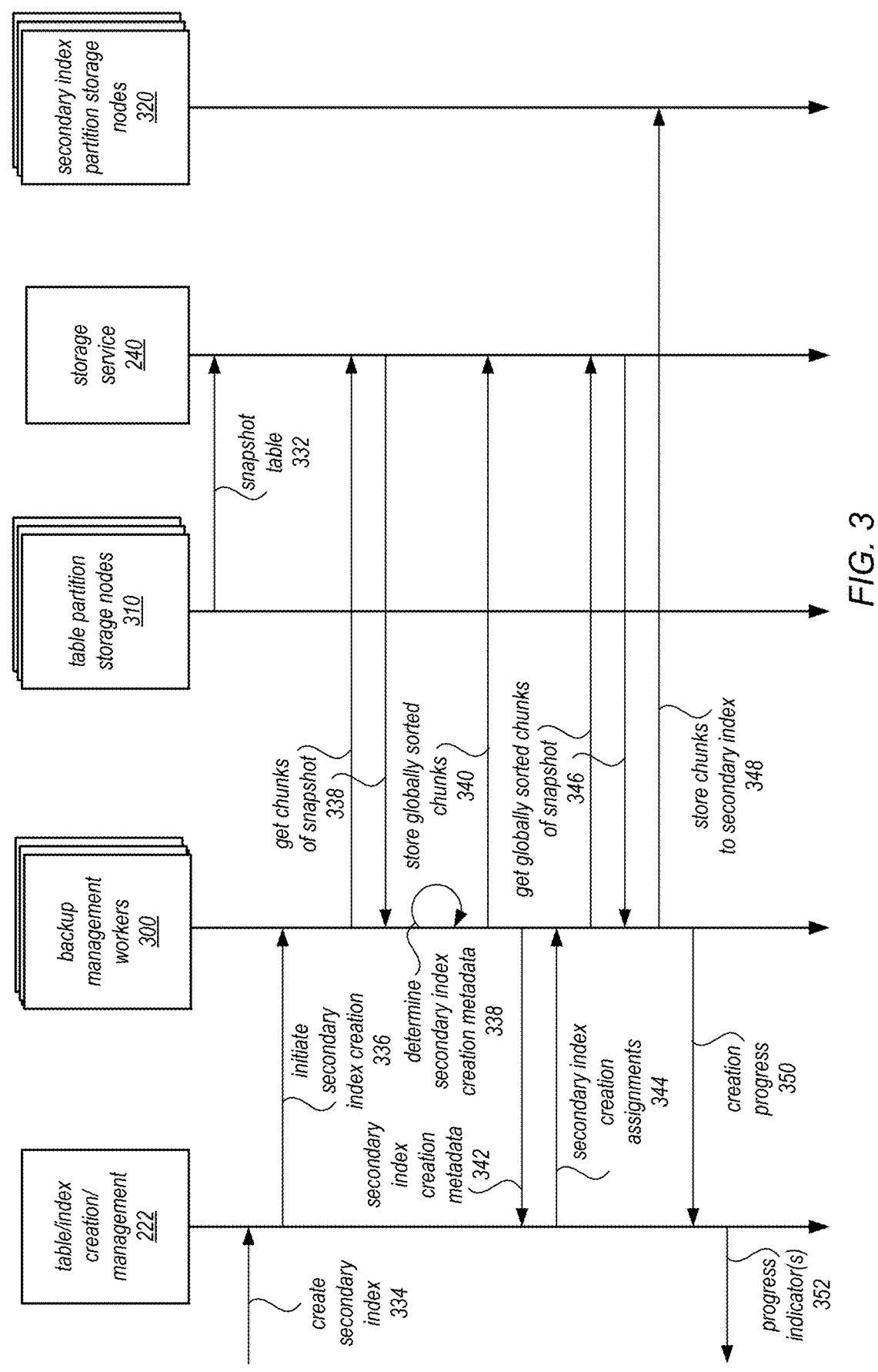
FIG. 3 is a logical block diagram illustrating an offline secondary index build from a table snapshot using an intermediate sorted version, according to some embodiments.

FIG. 3 is a logical block diagram illustrating an offline secondary index build from a table snapshot using an intermediate sorted version, according to some embodiments. As indicated at 332, table partition storage nodes 310 may periodically store a snapshot of a table to storage service 240. In some embodiments, a table snapshot may be created upon request and correspond to a particular period of time. As indicated at 334, a request to create a secondary index 334 may be received at table/index creation/management 222. The request may specify a time period, timestamp or other version identifier that may correspond to a state of table that is used to create a secondary index. The request 334 may specify a schema for creating the secondary index (e.g., a different set of items to include based on attribute existence or values and/or may sort items using a different attribute). As indicated at 335, table/index creation/management 222 may initiate secondary index creation by notifying backup management workers 300 (which may be managed or coordinated by backup management 228 discussed above with regard to FIG. 2).

In at least one embodiment, backup management workers 300 may get chunks of a snapshot that is to be used to create the secondary index, as indicated at 338, from storage service 240. In at least one embodiment, each backup management worker may be responsible for reading one or more chunks to obtain information to determine secondary index creation metadata 338. For example, metadata can include secondary index partition/chunk boundaries, total secondary index partition count, and total number of items per partition/chunk. Backup management workers 300 may then coordinate data exchanges to move from sorted chunks to a globally sorted intermediate version of a secondary index, as discussed below with regard to FIG. 4. Backup management workers 300 may store globally sorted chunks 340 in storage service 240.

As indicated at 342, backup management workers 300 may provide secondary index creation metadata 342 determined from an intermediate version of the secondary index. Table/index creation/management 222 may determine a distributed creation plan which may use to make secondary index creation assignments 344. Backup management workers 300 may then get globally sorted chunks of snapshot from storage service 240, as indicated at 346. Backup management workers may then store chunks to secondary index partition nodes 320, as indicated at 348.

As indicated at 350, backup management workers 300 may provide creation progress to table/index creation/management 222 to provide progress indicator(s) 352. In at least some embodiments, progress indicators 352 can be determined using secondary index creation metadata. Techniques that directly write a table copy (e.g., table snapshot) into partitions of the secondary index that make it difficult (or impossible) to provide an accurate estimation of progress there is no guarantee that the entire table data projects into index. For instance, a no-sql database allows null values to be inserted and so there is always a possibility of nothing projecting to index. In various embodiments that implement intermediate sorting for data set projection builds, metadata can be used to determine how much data of a table does project into a secondary index so that execution planning and progress information can be accurate. For example, with known partition boundaries, numbers of partitions, number of items in each partition, a backup worker would know exactly how much data it has written and how much is pending in order to calculate the per-partition and secondary index overall progress. For example, items per index chunk may be described as [100, 1, 1], weights per index chunk: [100/102, 1/102, 1/102]. Various ways of creating or representing progress indicators using such information can be shared via an interface (e.g., from table/index creation/management 222), such as a percentage of completion. Furthermore, such information can also be used to be provide a remaining build/creation time. For example, if there is a dedicated bandwidth or other known rate of storing data items from intermediate version to secondary index partitions (e.g., using a decided bandwidth at an admission control component for secondary index partitions), then the time to update a secondary index with X remaining items can be determined.

In at least one embodiment, table/index creation/management 222, backup management workers 300, and/or any other component of database service 210 may implement the following algorithm to create a secondary index:

1. Get table snapshot at time T
2. Calculate index projections in a merge-sort fashion and persist them in a durable location, including:
   a. Divide the table snapshot into N chunks and assign each worker a chunk
   b. Each worker reads the snapshots, calculates secondary index projections and sorts them on the fly using local or external sorting algorithm.
   c. Each sorted data in the intermediate store is now merged in merge-sort manner to create a global sorted data. Every time the size of the global sorted snapshot reaches X size (e.g., GB that a partition can support), it is written to an intermediate data store in a file and then a new file is created.
   d. Records first and last key of each index partition in metadata of this snapshot to create partition boundaries. Track the number of such snapshots and their partition boundaries in order to determine where updates to a secondary index will be routed for performance.
3. Use the metadata to create index partitions with those partition boundaries.
4. Each worker picks up one chunk each from the intermediate data store and writes it to the destination secondary index partition. Only that worker will continue to store data to that partition. If the partition receives too much workload, an admission control component can throttle or slow the worker, the worker will back off and retry.
5. Calculate progress on the fly—The progress will be accurate because the it is known exactly how much data that is going to each secondary index partition.

Figure 4:
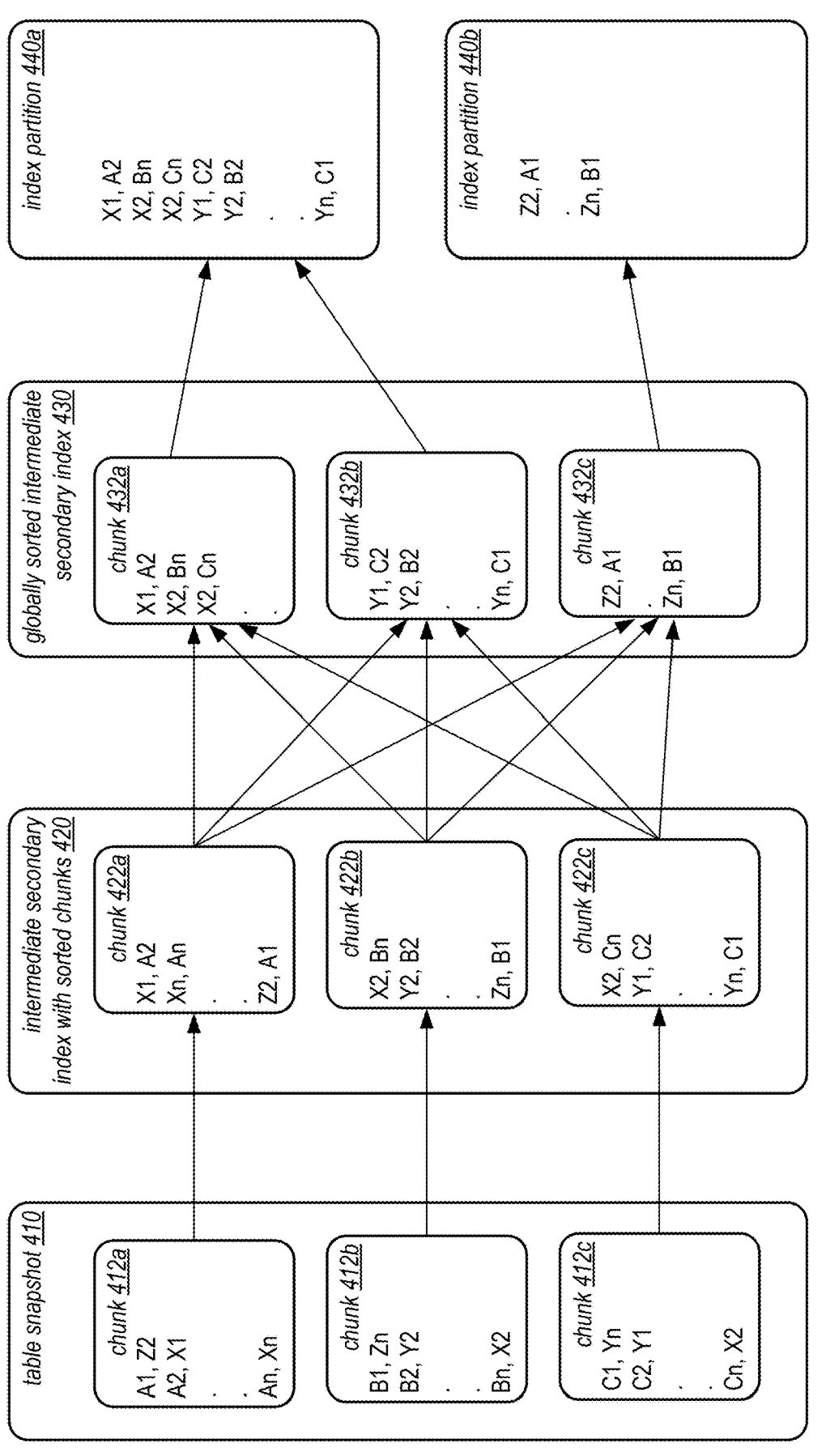
FIG. 4 is a logical block diagram illustrating changes to an intermediate sorted version of a secondary index, according to some embodiments.

FIG. 4 is a logical block diagram illustrating changes to an intermediate sorted version of a secondary index, according to some embodiments. As indicated at 410, table snapshot may be divided into multiple chunks, such as chunks 412a, 412b, and 412c. Each chunk may have items with different attribute values. For example, table snapshot 410 may be sorted or organized according to values for A, B, and C (e.g., chunk 412a is sorted from A1 to An, chunk 412b, is sorted from B1 to Bn, and chunk 412c is sorted from C1 to Cn). Other attributes and values of these items may not be ordered (e.g., values for X, Y, and Z).

In at least one embodiment, an initial read of chunks 412 from table snapshot 410 may be stored as an intermediate version of a projection with sorted chunks 420, including chunk 422a, 422b, and 422c. For example, chunk 422a may be a sorted version of chunk 412a that sorts according to a different schema for a secondary index being built so that values are sorted X1, Xn to Z2. Similarly, chunk 422b may be a sorted version of chunk 412b that sorts according to a different schema for a secondary index being built so that values are sorted X2, Y2 to Zn. Similarly, chunk 422c may be a sorted version of chunk 412c that sorts according to a different schema for a secondary index being built so that values are sorted X2, Y1 to Yn.

In at least one embodiment, intermediate secondary index with sorted chunks 420 may be globally sorted, as indicated at 430. As illustrated in FIG. 4, items may be redistributed across chunks to achieve a globally sorted set of chunks. For example, chunk 432a, may include items from chunks 422a, 422b, and 422c, so that it is sorted from X1 to X2. Similarly, chunk 432b may include items from chunks 422a, 422b, and 422c, so that it is sorted from Y1 to Yn. Similarly, chunk 432c may include items from chunks 422a, 422b, and 422c, so that it is sorted from Z2 to Zn.

In at least one embodiment, globally sorted intermediate secondary index 430 may be used to build a secondary index at different index partitions 440a and 440b. One or more chunks may be assigned and stored to each index partition, such as chunks 432a and 432b to index partition 440a and chunk 432c to index partition 440b.

The examples of a database that implements intermediate sorting for data set projection builds, as discussed in FIGS. 2-4 above, have been given in regard to a database service (e.g., a relational database, a document database, a non-relational database, etc.) However, various other types of database systems or storage systems can advantageously implement intermediate sorting for data set projection builds, where the data set and the projection use different schemas, in other embodiments. FIG. 5 is a high-level flowchart illustrating various methods and techniques to implement intermediate sorting for data set projection builds, according to some embodiments. These techniques, as well as the techniques discussed with regard to FIG. 6, may be implemented using components or systems as described above with regard to FIGS. 2-4, as well as other types of databases or storage systems, and thus the following discussion is not intended to be limiting as to the other types of systems that may implement the described techniques.

As indicated at 510, a projection of a data set stored across data stores according to a different schema may be created, in at least one embodiment. In at least one embodiment, the projection may be a secondary index created from one or more database tables, as discussed above with regard to FIGS. 2-4. In at least one embodiment, the projection of the data set may be requested via an interface, SQL statement, or other instruction. In at last one embodiment, the schema of the projection of the data set may be specified in the request. In at least one embodiment, null values or other information that is included in the data set may not project into the projection of the data set, which lead to uneven or skewed distributions across a large distributed data store storing the data set (e.g., some partitions may store a lot of data that projects while other partitions may store little or no data that projects).

As indicated at 520, a copy of the data set may be accessed to store an intermediate sorted version of the projection of the data set according to the different schema; and determine a number of portions to store the projection of the data set across the data stores, in at least one embodiment. In at least one embodiment, the copy of the data set may be a backup copy of the data set that is read-only such that it does not receive later updates to the data set. In at least one embodiment, the copy may be associated with a version, state or other point in time of the data set. As discussed in detail above with regard to FIG. 4, the copy may be divided into different chunks or other ranges of data that can be read and evaluated in parallel to create the intermediate sorted version of the data set. One (or multiple) sorts may be performed. Using metadata or other information obtained from the sorted intermediate version, such as the number of portions (e.g., partitions) that would need to be used to store the projection of the data set according to a portion capacity of each of the data stores (e.g., number of portions=total size of intermediate sorted version/size per data store). In some embodiments, the number of partitions can be computed on the fly by incrementing a number of portions as the amount of data is stored into intermediate sorted version.

As indicated at 530, execution may be distributed to create the projection of the data set from different portions of the number of portions to store at respective ones of the data sets, in at least one embodiment. For example, each portion can be assigned (e.g., as one or more chunks) to a computing resource (e.g., server, instance, container, or other computing node) that can read from an intermediate data store for the intermediate sorted version and store the portion to a corresponding one of the data stores assigned to store that portion. This technique can be performed in parallel, near-parallel, or other distributed fashion to take advantage of scaling up the number of computing resources to build or otherwise create the projection as fast as is possible (or within a resource utilization constraint).

As indicated at 540, one or more progress indicators of creating the projection of the data set may be provided based, at least in part, on the number of portions, in at least one embodiment. Progress indicators may include different forms of information. For example, in at least one embodiment, a progress indicator may be a completion percentage for a projection build determined based on metadata that includes a number of portions of the intermediate sorted version of the projection and number of items in each portion to copy to the projection. In another example, a progress indicator may include a time remaining to complete the projection. In another example, progress indicators may have a finer granularity, indicating percentage or other completion information on a per-portion (e.g., per-partition basis).

Figure 6:
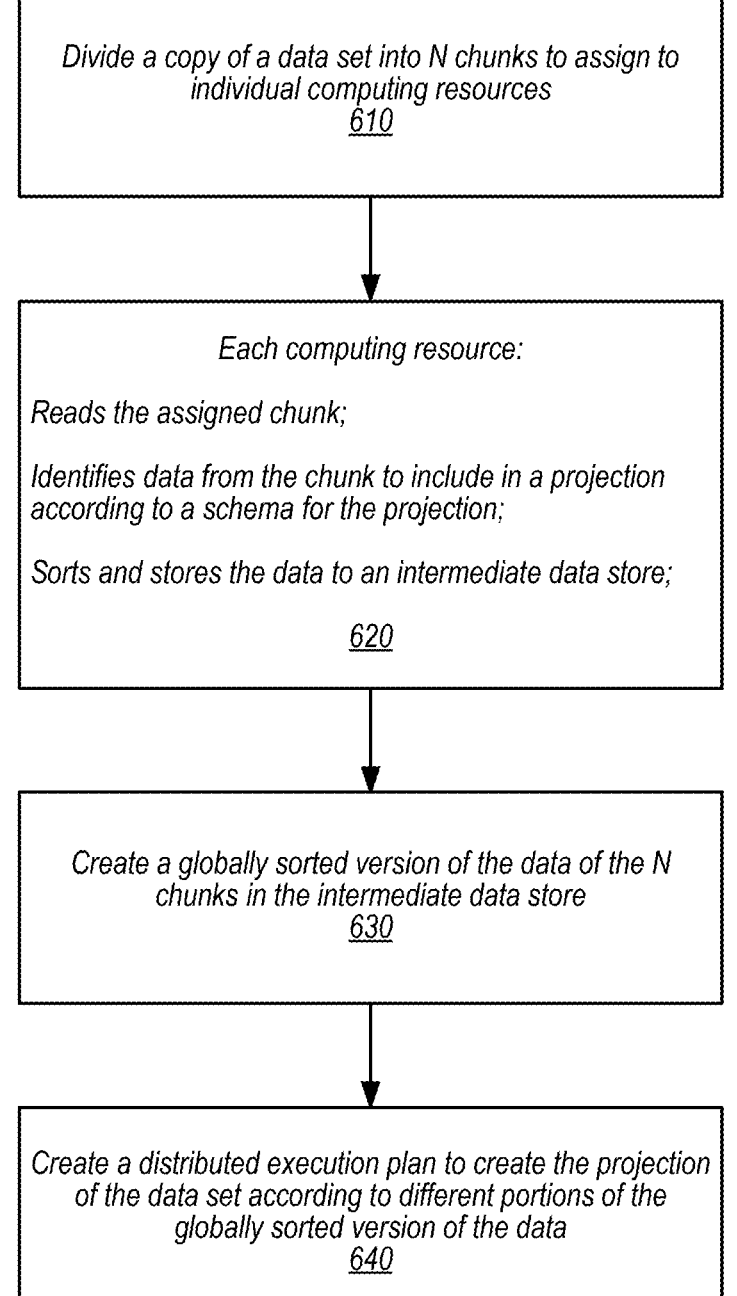
FIG. 6 is a high-level flow chart illustrating various methods and techniques to implement creating a distributed execution plan to create a projection of a data set using an intermediate sorted version, according to some embodiments.

FIG. 6 is a high-level flow chart illustrating various methods and techniques to implement creating a distributed execution plan to create a projection of a data set using an intermediate sorted version, according to some embodiments. As indicated at 610, a copy of a data set may be divided into N chunks to assigned to individual computing resources, in at least one embodiment.

As indicated at 620, each computing resource may be assigned to, read the assigned chunk, identify data from the chunk to include in a projection according to a schema for the projection, and sort and store the data to an intermediate data store, in at least one embodiment. Various different sorting techniques may be performed in order to sort items within a chunk according to a sort order defined in a schema for the projection. As indicated at 630, a globally sorted version of the data of the N chunks may be created in the intermediate data store, in at least one embodiment. For example, merge sort algorithm that applies a divide and conquer technique to recursively divide the preliminarily sorted set of chunks into smaller and smaller sub-arrays before merging them back together to create a globally sorted version data of the N chunks.

As indicated at 640, a distributed execution plan to create the projection of the data set according to different portions of the globally sorted version of the data, in at least one embodiment. For example, different portions (e.g., partitions) can be determined based on a size that data stores can support and then used to identify which partitions can be made from an intermediate sorted version. The distributed execution plan can identify a number of computing resources that can execute creation of the projection in parallel (e.g., a number of build workers) in order to ensure that no data store is overwhelmed to trigger a data movement (e.g., split) operation or an admission control mechanism (e.g., throttle requests to store data in the data store).

The methods described herein may in various embodiments be implemented by any combination of hardware and software. For example, in some embodiments, the methods may be implemented by a computer system (e.g., a computer system as in FIG. 7) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 7:
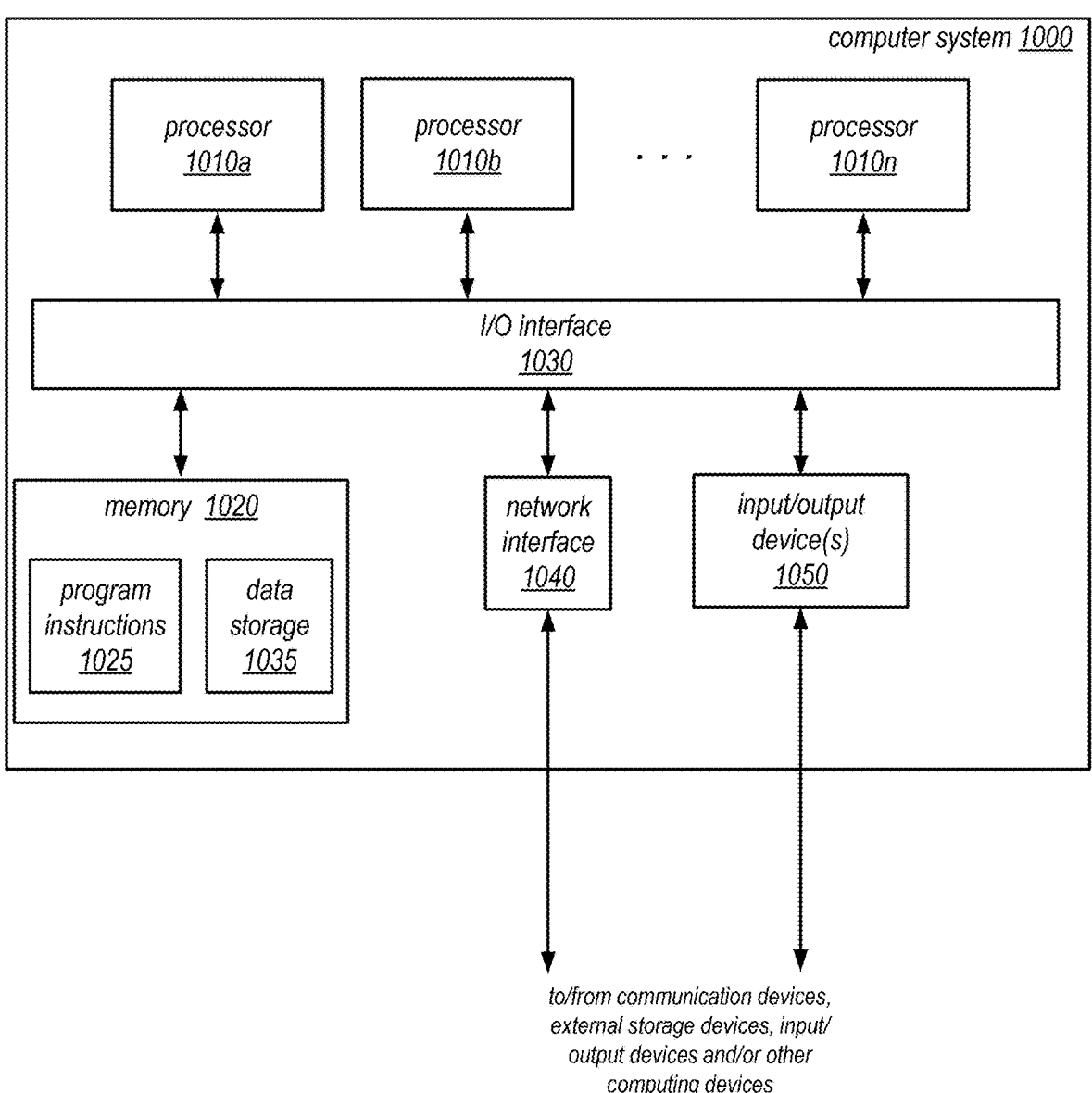
FIG. 7 is a block diagram illustrating an example computing system, according to some embodiments.

Embodiments to implement intermediate sorting for data set projection builds as described herein may be executed on one or more computer systems, which may interact with various other devices. One such computer system is illustrated by FIG. 7. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or compute node, computing device or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device, keyboard, and display(s). Display(s) may include standard computer monitor(s) and/or other display systems, technologies or devices, in some embodiments. In some embodiments, it is contemplated that embodiments may be implemented using a single instance of computer system 1000, while in other embodiments multiple such systems, or multiple nodes making up computer system 1000, may host different portions or instances of embodiments. For example, in some embodiments some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions, in some embodiments. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device, in some embodiments. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in some embodiments.

System memory 1020 may store program instructions 1025 and/or data accessible by processor 1010 to implement associating a function with a table in a database system, in some embodiments. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above to perform offline builds for projected data subsets are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. A computer-accessible medium may include non-transitory storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040, in some embodiments.

In some embodiments, I/O interface 1030 may be coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000, in some embodiments. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000, in some embodiments. Multiple input/output devices 1050 may be present in computer system 1000 or may be distributed on various nodes of computer system 1000, in some embodiments. In some embodiments, similar input/output devices may be separate from computer system 1000 and may interact with one or more nodes of computer system 1000 through a wired or wireless connection, such as over network interface 1040.

As shown in FIG. 7, memory 1020 may include program instructions 1025, that implement the various embodiments of the systems as described herein, and data store 1035, including various data accessible by program instructions 1025, in some embodiments. In some embodiments, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:

a plurality of computing devices, respectively comprising at least one processor and a memory, that implement a distributed data store;

wherein the distributed data store is configured to:

receive a request to create a projection of a data set stored across a plurality of data stores according to a different schema;

create the projection of the data set, wherein to create the projection of the data set, the distributed data store is configured to:

access a copy of the data set to sort data obtained from the copy of the data set to include in the projection according to the different schema;

store the sorted data as an intermediate sorted version of the projection of the data set according to the different schema; and determine a number of portions to be used to store the projection of the data set across the plurality of data stores; and distribute execution across a plurality of different computing resources to create the projection of the data set from different portions of the number of portions to store at respective ones of the plurality of data stores; and provide one or more progress indicators of creating the projection of the data set based, at least in part, on the determined number of portions.

2. The system of claim 1, wherein to create the projection of the data set, the distributed storage system is configured to:

divide the copy of the data set into a number of chunks to assign to individual computing resources;

cause each computing resource to read the assigned chunk;

identify data from the chunk to include in the projection according to the different schema;

sort and store the data into an intermediate data store; and create a globally sorted version of the data of the number of chunks in the intermediate data store.

3. The system of claim 1, wherein the distributed storage system is a database service of a provider network, wherein the data set is one or more tables, and wherein the projection is a secondary index.

4. A method, comprising:

creating a projection of a data set stored across a plurality of data stores according to a different schema, comprising:

accessing a copy of the data set to store an intermediate sorted version of the projection of the data set according to the different schema; and determining a number of portions to be used to store the projection of the data set across the plurality of data stores; and distributing execution to create the projection of the data set from different portions of the number of portions to store at respective ones of the plurality of data stores; and providing one or more progress indicators of creating the projection of the data set based, at least in part, on the determined number of portions.

5. The method of claim 4, wherein the one or more progress indicators comprise a completion percentage of creating the projection of the data set.

6. The method of claim 4, wherein the one or more progress indicators comprise a time remaining to complete creating the projection of the data set.

7. The method of claim 4, wherein distributed execution to create the projection of the data set uses a dedicated bandwidth at the respective ones of the plurality of data stores.

8. The method of claim 4, wherein accessing the copy of the data set to: store an intermediate sorted version of the projection of the data set according to the different schema; and determine a number of portions to be used to store the projection of the data set across the plurality of data stores, comprises:

dividing the copy of the data set into a number of chunks to assign to individual computing resources;

causing each computing resource to:

read the assigned chunk;

identify data from the chunk to include in the projection according to the different schema;

sort and store the data into an intermediate data store; and creating a globally sorted version of the data of the number of chunks in the intermediate data store.

9. The method of claim 4, wherein the distributed execution assigns individual computing resources to store data of the projection to one of the plurality data stores.

10. The method of claim 4, wherein the copy of the data set is a backup copy created for the data set and corresponding to a point in time.

11. The method of claim 4, wherein the data set is one or more tables of a non-relational database system and wherein the projection is a secondary index of the non-relational database system.

12. One or more non-transitory, computer-readable storage media, storing program instructions that when executed on or across one or more computing devices cause the one or more computing devices to implement:

receiving a request to create a projection of a data set stored across a plurality of data stores according to a different schema;

creating a projection of the data set, wherein creating the projection of the data set the program instructions cause the one or more computing devices to implement:

causing access to a copy of the data set to store an intermediate sorted version of the projection of the data set according to the different schema; and determining a number of portions to be used to store the projection of the data set across the plurality of data stores; and causing distributed execution to create the projection of the data set from different portions of the number of portions to store at respective ones of the plurality of data stores; and providing one or more progress indicators of creating the projection of the data set based, at least in part, on the determined number of portions.

13. The one or more non-transitory, computer-readable storage media of claim 12, wherein the one or more progress indicators comprise a completion percentage of creating the projection of the data set.

14. The one or more non-transitory, computer-readable storage media of claim 12, wherein the one or more progress indicators comprise a time remaining to complete creating the projection of the data set.

15. The one or more non-transitory, computer-readable storage media of claim 12, wherein, in creating the projection of the data set, the program instructions cause the one or more computing devices to further implement:

dividing the copy of the data set into a number of chunks to assign to individual computing resources;

causing each computing resource to:

read the assigned chunk;

identify data from the chunk to include in the projection according to the different schema;

sort and store the data into an intermediate data store; and creating a globally sorted version of the data of the number of chunks in the intermediate data store.

16. The one or more non-transitory, computer-readable storage media of claim 12, wherein the copy of the data set is a backup copy created for the data set and corresponding to a point in time.

17. The one or more non-transitory, computer-readable storage media of claim 12, wherein the one or more computing devices implement a database service of a provider network, wherein the data set is one or more tables, and wherein the projection is a secondary index.

* * * * *